United States Patent [19]

Henning

[11] Patent Number: 5,240,772
[45] Date of Patent: Aug. 31, 1993

[54] HIGH TENACITY, OBLONG CROSS-SECTION MONOFILAMENTS HAVING A MODIFICATION RATIO OF AT LEAST 4.4

[76] Inventor: Gregory N. Henning, 3205 Heathwood Rd., Wilmington, Del. 19810

[21] Appl. No.: 875,579

[22] Filed: Apr. 28, 1992

Related U.S. Application Data

[63] Continuation of Ser. No. 664,264, Mar. 4, 1991, abandoned, which is a continuation of Ser. No. 288,750, Dec. 22, 1988, abandoned.

[51] Int. Cl.$^5$ ............... B60C 9/00; D02G 3/00; B32B 27/08; B32B 27/06
[52] U.S. Cl. .................... 428/400; 152/556; 428/364; 428/397; 428/474.4; 428/480; 428/910
[58] Field of Search .............. 428/364, 373, 374, 397, 428/400, 474.4, 480, 910; 152/556

[56] References Cited

U.S. PATENT DOCUMENTS

| | | | |
|---|---|---|---|
| 3,298,417 | 12/1962 | Keefe, Jr. | 152/330 |
| 4,056,652 | 11/1977 | Gauntt | 428/400 |
| 4,850,412 | 7/1989 | Gupta | 152/556 |

*Primary Examiner*—Jenna L. Davis
*Assistant Examiner*—James D. Withers

[57] ABSTRACT

A monofilament of oriented thermoplastic polymer having an oblong cross-section defining a width-to-thickness ratio for the monofilament greater than about 2.0 and a modification ratio not less than 4.4, a denier greater than about 1000, a tenacity of greater than about 7.5 g/d, and a modulus greater than about 45 g/d.

11 Claims, 1 Drawing Sheet

HIGH TENACITY, OBLONG CROSS-SECTION MONOFILAMENTS HAVING A MODIFICATION RATIO OF AT LEAST 4.4

This is a continuation of application Ser. No. 07/664,264 filed Mar. 4, 1991, now abandoned, which is a continuation of application Ser. No. 07/288,750, filed Dec. 22, 1988 is now abandoned.

BACKGROUND OF THE INVENTION

The present invention relates to high tenacity monofilaments suitable for a variety of applications including use as reinforcement in rubber products. More particularly, the invention relates to monofilaments with high tenacity and an oblong cross-section and a rubberized fabric containing such monofilaments.

Nylon or polyester multifilament yarns are typically used in ropes, cables, braided structures, and industrial fabrics and for reinforcement of tires, belts, hoses and other mechanical rubber products. For use as rubber reinforcement, cords are produced from the multifilament yarns which are comprised of an appropriate number of singles yarns plied together to produce total deniers ranging from about 1500 to about 6000 or more. In such cords, the yarns and the cord itself is twisted and has a generally round shape in cross-section.

While it is otherwise advantageous to produce multifilament cords higher in denier to increase strength, the resulting thick, generally round cross-section cords have several disadvantages. Bending moment increases exponentially with the thickness and, consequently, there is difficulty in fabricating and manipulating articles reinforced with such cords. Due to the thickness, tires incorporating such cords require more rubber than is otherwise needed which increases the cost and results in heat build-up in the tire in use. In non-rubber applications, products containing multifilament yarns of all deniers are subject to damage by abrasion.

High tenacity monofilaments are known as an alternative to multifilament yarns. The use of monofilaments in tires is disclosed in U.S. Pat. Nos. 4,009,551 and 4,056,652 and in Product Licensing Index, April 1972. Co-pending application Ser. No. 106,661 discloses a radial tire containing monofilaments. However, known high tenacity monofilaments have not provided sufficient improvement over multifilament yarns to be employed widely. Other known uses of monofilaments include tennis racket strings as disclosed in U.S. Pat. No. 4,055,941 containing from two to four monofilaments and as fishing line as disclosed in co-pending application Ser. No. 106,653.

SUMMARY OF THE INVENTION

In accordance with the invention, there is provided a monofilament of oriented thermoplastic polymer having an oblong cross-section with a width-to-thickness ratio of greater than about 2.0 and a modification ratio greater than about 4.0. The monofilament has a denier of greater than about 1,000, a tenacity of greater than about 7.5 g/d and a modulus greater than about 45 g/d. In accordance with a preferred form of the present invention, the thermoplastic polymer is selected from the class consisting of polyamide and polyester homopolymers and copolymers. Preferably, the thermoplastic polymer is a polyamide comprising at least about 90 percent of at least one of poly($\epsilon$-caproamide) or poly(-hexamethylene adipamide) and the monofilament has a tenacity above 8.0 g/d and a modulus of greater than about 50 g/d. A most preferred embodiment is a monofilament of homopolymer poly(hexamethylene adipamide). It is also advantageous for the monofilament to have a surface layer of at least about 3 and less than about 15 microns thick which has an orientation lower than the core and a parallel refractive index for the polymer in the surface layer of less than about 1.57.

In accordance with another form of the invention, the thermoplastic polymer of the monofilament is a polyester, most preferably poly(ethylene terephthalate).

In another preferred form of the invention, the monofilament is "ready-for-rubber" and the surface of the monofilament has an adhesive coating of from about 0.5 to about 6.0 percent by weight based on the weight of the monofilament and the monofilament has a shrinkage of less than about 6%, most preferably less than 4.5%.

A rubberized fabric in accordance with the invention comprises a rubber matrix containing the high strength, high modification ratio monofilaments as reinforcement, preferably with the monofilaments being substantially free of twist and arranged in the fabric in a generally parallel, generally evenly spaced-apart relationship.

The monofilaments in accordance with the present invention have advantages in a variety of end-uses and provide for greater productivity in their manufacture when compared with multifilament cords and known monofilaments. In rubber reinforcement applications, monofilaments in accordance with the invention provide novel reinforced rubber fabrics with fewer cords per inch than known rubberized fabrics. At the same time, the monofilaments reduce the amount of rubber required in a fabric having a given strength while providing equivalent or even better fatigue resistance. In a variety of non-rubber applications, monofilaments of the invention provide excellent abrasion resistance and permit very high deniers to be used with surprisingly low stiffness.

DETAILED DESCRIPTION

Polymers useful for monofilaments in accordance with the invention include various thermoplastic homopolymers and copolymers having sufficiently high molecular weights to achieve high strength monofilaments. Polyamide homopolymers and copolymers having a relative viscosity of above about 50 on a formic acid basis are particularly useful. Polyamides for producing monofilaments of the invention include poly(hexamethylene adipamide) and poly($\epsilon$-caproamide), poly(-tetramethylene adipamide), etc., and their copolymers. Preferably, the polyamide is at least about 90% of one of poly-($\epsilon$-caproamide) or poly(hexamethylene adipamide). Most preferably, the polyamide is homopolymer poly(hexamethylene adipamide). Polyester homopolymers and copolymers having an intrinsic viscosity of above about 0.7 are also advantageously employed. Polyesters include poly-(ethylene terephthalate), poly-(propylene terephthalate), poly-(butylene terephthalate), poly-(ethylene 2,6 napthoate), poly-(1,4 cyclohexanedimethanol terephthalate), and their copolymers. Particularly preferred is poly(ethylene terephthalate).

Monofilaments in accordance with the invention are produced by spinning the polymer in a process which produces high strength monofilaments. For polyamide monofilaments, the process of U.S. Pat. No. 4,009,511, incorporated herein by reference, is particularly preferred because the use of steam in the first stage draw produces a highly deoriented layer on the filament surface of about 3 to about 15 microns thick which has a lower orientation than the core of the filament. This surface layer is characterized by a parallel refractive index, n $\parallel$, of less than about 1.57 as determined by the method described in U.S. Pat. No. 4,009,511. The deoriented surface is believed to be responsible for the superior bonding of polyamide monofilaments having such surface to rubber when an adhesive such as resorcinol formaldehyde latex (RFL) is employed.

For polyesters, particularly poly(ethylene terephthalate), the process described in U.S. Pat. No. 3,963,678, incorporated herein by reference, is useful for making polyester monofilaments in accordance with the invention provided that a suitable spinneret, e.g., rectangular, obround, oval, etc. is employed as will become more apparent hereinafter.

Figure 1A:
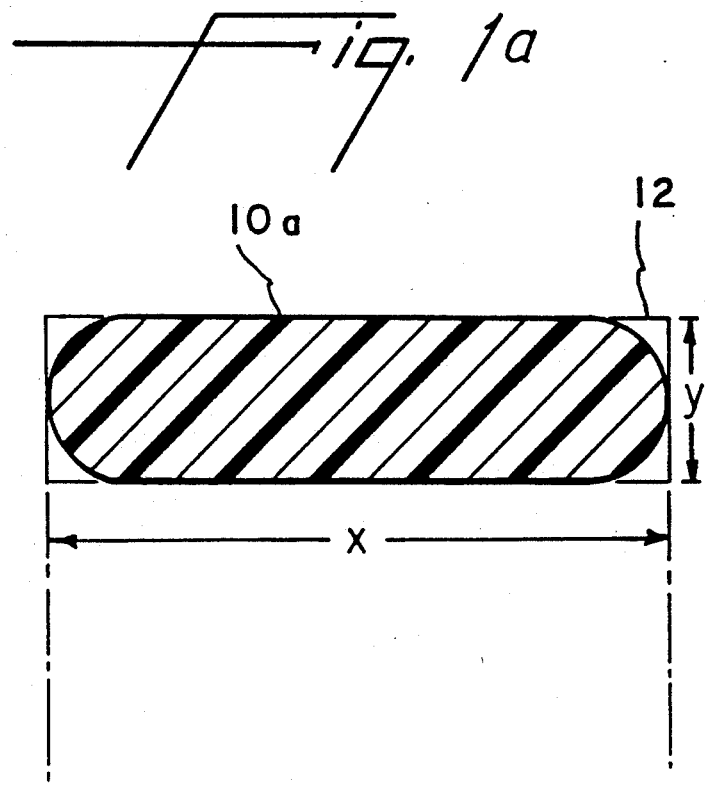
FIGS. 1a and 1b are cross-sectional views of preferred monofilaments in accordance with the invention.
Figure 1B:
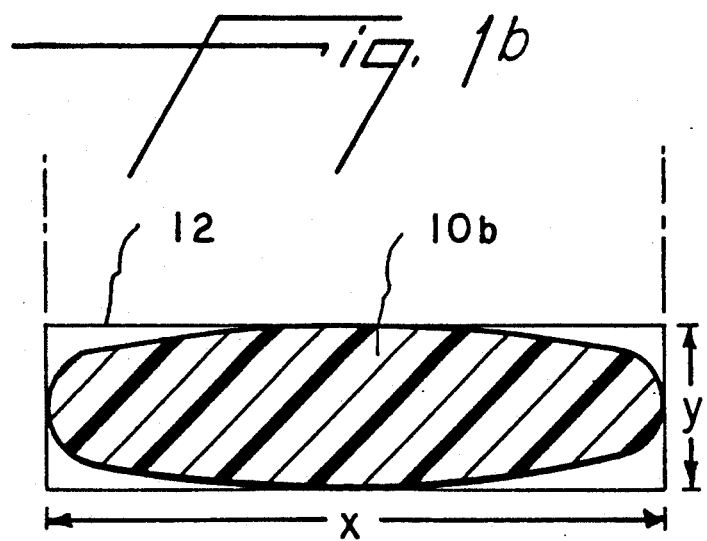

Referring to the FIGS. 1a and 1b depicting preferred monofilaments in accordance with the invention, the monofilaments 10 of the invention have an oblong cross-section. By "oblong", it is intended to refer to any of a variety of elongated cross-sectional shapes which are circumscribed by a rectangle 12 as shown in FIGS. 1a-1b with its width (major dimension) designated in the drawing by "x" greater than its thickness (minor dimension) designated by "y".

Preferably, in a monofilament in accordance with the invention, the cross-section is obround as shown in FIG. 1a, i.e., having a generally rectangular cross-section with rounded corners or semicircular ends and thus is produced by spinning through an obround or rectangular spinneret. Depending on the viscosity of polymer as extruded, the resulting monofilament has a cross-section which may vary somewhat from the cross-section of the spinneret and may assume some oval character and the "flat" areas may be somewhat convex. As used herein for cross-sections of monofilaments, obround is intended to refer to obround cross-sections or those which approximate obround cross-sections. Other preferred embodiments include monofilaments with an oval cross-section as shown in FIG. 1b.

The width-to-thickness ratio of the monofilaments, i.e., the width x of the circumscribing rectangle divided by the thickness y, is greater than about 2.0. While the advantages of the invention are realized increasingly with increasing width-to-thickness ratios, a practical upper limit for the monofilaments is ultimately reached when the intended use of the monofilaments is for rubber reinforcement. At a constant rivet area of, for example, 35% (relative space between monofilaments maintained constant at 35%), the spacing needed between adjacent cords can become so large that there will be insufficient support for the rubber between cords resulting in rubber failure. Also, in a variety of applications, as the width-to-thickness ratio becomes very large (film-like filament) high shear and bending stresses will ultimately cause filament buckling and splitting. Thus, it is generally preferable for the width-to-thickness ratio of monofilaments of the invention not to exceed about 20.

The modification ratio of monofilaments in accordance with the invention is greater than about 4.0. Viewing the monofilaments in cross-section, modification ratio refers to the ratio of the diameter of the smallest circumscribing circle to the diameter of the largest inscribing circle determined by the monofilament cross-sectional surface.

The tenacity of the monofilaments in accordance with the invention is greater than about 7.5 g/d and, when the polymer is a polyamide at least about 90% of which is one of poly-($\epsilon$-caproamide) or poly(hexamethylene adipamide), is preferably greater than about 8.0 g/d. The modulus is above about 45 g/d and preferably is above about 50 g/d when the polymer is a polyamide at least about 90% of which is one of poly-($\epsilon$-caproamide) or poly(hexamethylene adipamide). When the monofilament is a polyamide monofilament, the toughness of the monofilaments is greater than about 0.7 g-cm/denier-cm. Knot strength for polyamide monofilaments is above about 5.0 g/d.

The denier of the monofilaments is above about 1,000 and can be as great as about 12,000 or more. Since the advantages of the monofilaments of the invention are more pronounced at high deniers, monofilaments having a denier of greater than about 2,000 are preferred.

In preferred monofilaments of the invention which are "ready-for-rubber" and can be incorporated into rubber products without operations such as stretching and dipping, the shrinkage is less than 6%, preferably less than 4.5%, otherwise the size and uniformity of tires, belts and similar products are adversely affected. The "ready-for-rubber" monofilaments of this invention have an adhesive coating on the filaments which facilitates the bonding of the filament to rubber. The most commonly used coating contains a combination of resorcinol, formaldehyde and latex, and is commonly referred to as RFL. Other adhesive coatings could be used as long as they promote the bonding between the monofilament and rubber. Surprisingly, low levels of RFL on the monofilaments, 0.5–6.0%, yield good adhesion to rubber.

The adhesive coating can be applied to the monofilament by any of the typical processes for coating a monofilament, such as dipping in a bath containing a dispersion or solution of adhesive materials, spraying a dispersion or solution of adhesive materials on the filament, applying molten or neat liquid adhesive on the filament, etc. In a preferred process, the untwisted monofilament is dipped in an aqueous dispersion of the adhesive, such as RFL, so that 0.5–6.0 weight percent adhesive is picked up (dry weight of adhesive on dry-weight filament basis). The still-wet monofilament is oven treated at 300°–500° F. to dry and set the monofilament in one or more stages. The monofilament tension is controlled during the heating stages and the monofilament may be stretched or relaxed during the heating stages depending on the final cord properties desired. The dipping, stretching, setting conditions for the monofilament are adjusted to suit the oriented polymer of the monofilament and the end-use for which it is to be used. For certain monofilaments, such as polyester, it is helpful to precoat the filament with an adhesion activator, prior to coating with the adhesive. A typical precoat for polyester contains a mixture of LVBI isocyanate, gum tragacanth and epoxy resin (N.E.R.-10A) as an aqueous dispersion. Other epoxy, aziridine, isocyanate or urethane precoats can be used, or combinations of such precoats.

The monofilament of this invention, prepared with the specified properties, and adhesive coating described above, is ready for direct embedment in rubber. The product does not require any of the following steps: singles or ply twisting, weaving, adhesive dipping, stretching or setting. The monofilament requires no twist while it is well known that analogous multifilament yarns require singles and ply twisting to achieve the desired level of fatigue resistance in tires. Creel calendaring, i.e., embedding a warp of nonwoven monofilament ends in rubber to produce a fabric with the monofilaments in a generally parallel and evenly spaced-apart relationship, is advantageously employed to produce rubber fabrics suitable for use in tire building.

Monofilaments in accordance with the invention are useful for various applications where multifilament yarns and cords are now used such as rubberized and unrubberized industrial fabrics and braided products and are used similarly to such multifilament yarns and cords. The monofilaments are particularly well-suited for applications where high flexibility is needed along with high denier. In slings, straps, unrubberized belts and similar products, multifilament yarns and cords are woven or braided into "narrow fabrics" which conventionally have relatively poor abrasion resistance. Narrow fabrics can be made of monofilaments in accordance with the invention which have good flexibility and also high abrasion resistance.

The invention is further illustrated in the examples which follow in which the results reported are determined by the following test methods.

TEST METHODS

Conditioning

Large denier monofilaments of this invention require up to 10 days for the moisture content to fully equilibrate with atmospheric moisture. In the testing of filaments described in the following, various periods of time less than that required to achieve full moisture regain were sometimes used. For example, a 2000 denier monofilament that is about 0.012" thick takes about three days to equilibrate, but a 6000 denier filament that is about 0.018" thick takes about five days. The actual length of time required depends on the thickness of the monofilament. Therefore, the deniers and denier dependent properties of the examples changed as testing in sequential steps took place. Each Table states the age/-conditioning period applicable to the properties in that table. For properties set forth in the claims, measurement is intended at full moisture equilibration (when two measurements of denier 24 hours apart are the same).

Relative Viscosity

Relative viscosity of polyamides refers to the ratio of solution and solvent viscosities measured in capillary viscometer at 25° C. The solvent is formic acid containing 10% by weight of water. The solution is 8.4% by weight polyamide polymer dissolved in the solvent.

Width and Thickness

Width and thickness are measured with a Starrett Model 722 digital caliper or equivalent instrument. For width measurements it is convenient to fold the monofilament into a "V" and measure both sides of the "V" at the same time, being sure to keep the vertex of the "V" just outside the measured zone. This technique assures that the monofilament does not tilt between the faces of the measuring instrument giving a low reading.

Modification Ratio

Modification Ratio is measured from a photomicrograph of a monofilament cross-section taken perpendicular to the filament axis. Using a compass, the smallest circle that can be circumscribed about the cross section and the largest circle that can be inscribed within the cross section are determined, and the diameters of these two circles measured. Modification Ratio=diameter of the circumscribed circle/diameter of the inscribed circle. For relatively simple cross sections such as those illustrated in FIGS. 1a and 1b, it is evident that modification ratios and width-to-thickness ratios are equivalent. For more complex cross-sections, the two ratios can be quite different.

Denier

The monofilament is conditioned at 55±2% relative humidity, and 75°±2° F. on the package for a specified period, usually 24 hours when the monofilament has aged more than ten days since being made. A nine meter sample of the monofilament is weighed. Denier is calculated as the weight of a 9000 meter sample in grams. A denier correction for any adhesive present on cord or monofilaments is made based on the measured amount of adhesive on the filament as determined below.

Weight % adhesive on monofilament

Adhesive on monofilament is determined by weighing an adhesive treated sample that has been cut into short (1 inch or less) sections. The polymer portion of the cut sample is then dissolved in an appropriate solvent (hot formic acid for polyamide, trich)oroacetic acid and methylene chloride mixture for polyester). After rinsing and drying, the weight of the undissolved adhesive is measured and the % adhesive on monofilament determined by dividing the weight of undissolved adhesive by the weight of the monofilament without adhesive and multiplying by 100.

Shrinkage

Yarn shrinkage was determined by the basic method of ASTM D-885-85, Section 30.3 as described in:

"1988 Annual Book of ASTM Standards; Vol. 07.01; Textiles, Yarns, Fabrics and General Test Methods."

Specifically, the yarns were heated at 177° C. in hot air for two minutes at 0.05 gm. per denier restraining force. The test device was a "Testrite Thermal Shrinkage Oven".

Tensile Properties

Before tensile testing of as-spun monofilaments, the monofilament is conditioned on the package for a minimum specified period at 55±2% relative humidity, and 75°±2° F. (unless otherwise noted). This period is usually 24 hours when the filament has aged more than ten days since spinning. By contrast, the denier and tensiles for any dipped cords reported herein are measured on samples relax-conditioned in skein form at the time, temperature and humidity indicated above. A recording Instron unit is used to characterize the stress/strain behavior of the conditioned monofilament. Samples are gripped in air-activated Type 4-D Instron clamps maintained at at least 40 psi pressure. Samples are elongated to break while continuously recording monofilament stress as a function of strain. Initial gauge length is 10 inches, and cross head speed is maintained at a constant 12 inches/minute. On monofilaments 24 hours old or less, tensile properties were measured at a constant crosshead speed of 6 inches/minute.

Break Strength is the maximum load achieved prior to rupture of the sample and is expressed in pounds or kilograms.

Tenacity is calculated from the break strength divided by the denier (after correcting for any adhesive on the filament) and is expressed as grams per denier (g/d).

Elongation is the strain in the sample when it ruptures.

Modulus is the slope of the tangent line to the initial straight line portion of the stress strain curve, multiplied by 100 and divided by the dip-free denier. The modulus is generally recorded at less than 2% strain.

The knot tensiles are measured in the same manner as straight tensiles except that a simple overhand knot is tied in the monofilament at about the midpoint of the sample to be tested. The simple overhand knot is made by crossing a length of monofilament on itself at about the midpoint of its length and pulling one end through the loop so formed. Since the monofilament tends to assume some of the curvature of the wind-up package, the knot is tied with and against this curvature on separate samples and the two values averaged.

Toughness is measured by dividing the area underneath the stress-strain curve by the product of the Instron gauge length and the corrected denier.

Fabric Bending Stiffness

Fabric bending rigidity is measured by using a Mitex MK II Bending Tester manufactured by IDR, Needham, Massachusetts. In this test, a fabric sample about 2 inches (5.1 cm.) long and 0.375 inches (0.95 cm) wide is cut from a rubberized fabric containing the test cords aligned parallel to one another and to the long (2 inch) dimension of the sample. This sample is inserted between pins mounted on the sample block and between the pin on the micrometer and the arm of the force transducer. Then, the pin mounted on the micrometer is adjusted to bring the fabric sample into light contact with the arm of the force transducer. The distance from the sample block pin to transducer arm is 1 inch. The sample block moves to bend the sample into circular arcs of progressively increasing curvature (curvature=1/radius of curvature). The maximum curvature is 1.5 in.$^{-1}$. The outputs of the force transducers and a transducer which measures block rotation are fed to an X-Y recorder. Since the bending moment on the sample equals the force on the force transducer times the distance between the sample block pin and the arm of the force transducer and the curvature is proportional to the block rotation, the output plot gives the yarn moment-curvature response.

The slope of the moment-curvature plot equals the sample rigidity and has units of force-length$^2$. The instrument is calibrated before measurements are made by measuring the slope of a stainless steel strip of calculated rigidity, 0.002 inch (0.0051 cm.) thick and 0.5 inch (1.27 cm.) wide inserted in place of the fabric. The rigidity of the stainless steel strip is calculated by the following equation:

$$R_c = w_c t_c E_c / 12$$

where
$R_c$ = Rigidity of calibration strip
$w_c$ = width of calibration strip = 0.5 in.
$t_c$ = thickness of calibration strip = 0.002 in.
$E_c$ = Young's modulus of calibration strip = 30,000,000 psi.

therefore:

$$R_c = 0.010 \text{ in}^2\text{-lb}$$

The slope of the calibration strip plot is divided into the calibration strip's calculated rigidity to give the calibration factor. The rigidity of any unknown fabric sample equals its slope times the calibration factor.

Five fabric samples from each item are measured as above and the results are averaged to give the values for R for the rubberized test fabrics.

The fabric bending stiffness (in$^2$-lbs/in.) is determined by dividing R by the width of the sample strip (0.375 in.).

Flex Fatigue

Flex fatigue is measured by determining the strength loss in test cords after cycling a 2-ply rubberized strip containing the test cord over a small pulley. 2-ply strips are prepared by wrapping a 9"×18" sheet of 0.015" 80:20 NR:SBR rubber on a building drum. RFL adhesive treated test cord is then wound onto the drum using a lathe to uniformly control cord spacing. End count is adjusted to provide 35% rivet area. A second layer of 0.015" rubber is then applied and the composite is stitched to remove entrapped air. The assembly is removed from the drum, cut into two 8"×9" pieces (cord parallel to the 9" direction), and placed on top of one another such that the cords in each ply are parallel to one another. A 2"×8" strip of cotton duck (provides gripping surface for clamps in fatigue tester) is applied across each end of the warp and a 0.030" (5"×8") sheet of rubber is used to fill in the area between the two cotton strips. These same materials are applied to the opposite side of the pad. The 2 ply pad is then cured in a platen press for 20 min at 160 deg C. under 7 tons pressure. The cured pad is cooled, conditioned 8 hours at 55% RH/75 deg F., and then cut into 1"×9" strips. The strips are then bent 180 degrees around a 7/16" diameter pulley and clamped at each end in the Scott Flex Tester (model Z) (manufactured by Scott Testers Inc., Providence, N.J.) and loaded at one end to 150 lb. The strip is then flexed over the pulley at a rate of 250 cycles per minute for a total of 230,000 cycles, while maintaining an ambient temperature of 100 deg C. The cords from the ply closest to the pulley are then removed from the pad (after soaking the pad for 24 hours in a 50/50 blend of Stoddard solvent and Freon 113) and the tensile strength is then measured on an Instron. The retained strength is compared with cord removed from an unflexed pad. Flex fatigue retained strength is determined from the equation: Retained Strength = 100×(fatigued strength/unfatigued strength).

Rolling Resistance

Rolling resistance was measured using the torque sensor method described by R. L. Keefe and A. S. Koralek in their paper "Precision Measurement of Tire Rolling Resistance", ACS Rubber Division Symposium: Tire Rolling Resistance (Oct. 1982), pp 78-104, D. J. Schuring, ed., 1983. Slip angle was adjusted to provide zero side force and rolling resistance was measured at 50 mph, 30 psi inflation pressure and 670 lb load for the P155/80R13 tires.

Cornering Coefficient

Cornering coefficient is measured on the same apparatus used for the rolling resistance measurement. Tires are first exercised for 90 minutes at 70 mph, 100% TRA (Tire and Rim Association) rated load. After cooling, the tires are conditioned 4 hours at 75 deg F., and 26 psi. The tire is then warmed up for 5 minutes at 35 mph at the specified test load (838 lbs for P155/80R13). Lateral force is then recorded as a function of slip angle as the tire is steered from 0 to +3 degrees and from 0 to −3 degrees, changing the slip angle at a rate of 1¼ degree per second. The slope of the cornering force/slip angle plot (lbs/degree) is divided by the test load on the tire to obtain the cornering coefficient.

Tire Temperatures

The temperatures of running tires were determined by inserting thermocouples into the contained air cavity of the tire during wheel testing. The thermocouples were connected to the tires via a slip-ring assembly and temperatures were monitored continuously.

Bead Area Endurance of Passenger and Truck Tires

This test is designed to induce flex type failures around the turn-up area (without thermal degradation interference) through high load applications.

The tire is mounted on an appropriate heavy-duty test rim and conditioned at 100° F. for 4 hours at 24 psi. The pressure is readjusted to the maximum psi allowed for the specified load range and then conditioned for another 4 hours.

The tire is then tested at 30 mph in the following sequence until failure: 90% load, 2 hours; 115% load, 2 hours; 150% load, 20 hours; 170% 20 hours; 190% load, 20 hours; and 210% load, until failure.

Carcass Strength

Carcass strength is calculated by multiplying the cord strength in lbs by the number of cord ends per inch in the carcass fabric and multiplying that result by the number of carcass plies in the tire.

Rivet Area

Rivet area is a measure of the amount of unreinforced rubber in the carcass or belt plies and is calculated from the following equation:

Rivet Area = 100[1 − (cord width × ends per unit width of fabric)].

EXAMPLE 1

This example describes the preparation of 4390 denier poly(hexamethylene adipamide) monofilament with a width-to-thickness and modification ratio of 4.8.

High quality poly(hexamethylene adipamide) polymer is made in a continuous polymerizer having a relative viscosity of 70 and is extruded into a filament at the rate of 43 pounds per hour (19.6 kg/hr) through a rectangular spinneret orifice having rounded corners (2.24×12.7 mm), is passed vertically downward through an air gap of 25½ inches (64.8 cm), and is quenched in water at 22° C. for a distance of about 127 inches (323 cm). After water quenching, the amount of residual quench water on the filament is regulated by adjustment of the air flow in an air jet so that quantity of water on the surface of the filament is between 10 and 25% by weight water on the dry weight of the monofilament. The wet monofilament is then forwarded in sequence to a puller roll at 128.8 ypm (117.7 mpm), pretension rolls at 128.9 ypm (117.8 mpm), and feed rolls at 131 ypm (120 mpm). After the feed rolls, water is added to the monofilament by contacting the filament with felt wicks supplied at the rate of 0.8 gallon per hour (13% water based on dry weight of the filament) and the filament is forwarded into a 36 cm long steamer and treated with saturated steam at 145 psig (180° C.). The steamer has entrance and exit steam expansion chambers connected to a vacuum source to prevent steam from leaking into the plant environment. The draw point is maintained in the entrance steam expansion chamber.

While still in the steamer but near the exit end, the monofilament is run through a bath about 3 cm long containing water at a temperature of about 60° C. and flowing at the rate of about four gallons per hour. The surface of the monofilament is cooled in the bath before leaving the steamer. The monofilament is then forwarded to an air stripper which removes most of the surface water from the filament to a level <2% water on weight of the dry filament. The monofilament is then forwarded to the first stage draw rolls which are heated to 155° C. and running at 488 ypm (446 mpm).

The filament is then forwarded in three passes through a radiant heater of about 50 inches (127 cm) in length at a mean temperature of about 870° C. Three controlled-speed change-of-direction rolls are employed to advance the monofilament through the heater and to control the amount of draw in each pass. The roll speed before pass 1 is 506 ypm (463 mpm) before pass 2 is 623 ypm (569 mpm), before pass 3 is 679 ypm (621 mpm), and after pass 3 is 735 ypm (666 mpm). The monofilament is then forwarded to second-stage draw rolls running at about 750 ypm (686 mpm), let down rolls at about 736 ypm (673 mpm) and to a wind-up package. The tension at wind-up is about 750 grams and is adjusted to give good package formation.

The product of the process is an obround 4.8 width-to-thickness and modification ratio monofilament of 4390 denier with properties after 24 hours of conditioning of:

| | |
|---|---|
| Tenacity (gpd) | 9.2 |
| Break Elongation (%) | 18 |
| Knot strength (gpd) | 5.4 |
| Modulus (gpd) | 52.0 |
| Width (inches) | .058 |
| Thickness (inches) | .012 |
| Toughness (g-cm/denier-cm) | .75 |

Monofilament tire cords were prepared from monofilament of this Example by the method described in Example 3 hereinafter and demonstrated the following fully conditioned properties:

| | |
|---|---|
| Denier (fully cond.) | 4540 |
| Dip Pick-Up, % | 6.0 |
| Brk. Str., kg | 39 |
| 177° C. Shrinkage, % | 4.7 |
| Toughness (g-cm/denier-cm) | .82 |
| Modulus (gpd) | .48 |

EXAMPLE 2

This example describes the preparation of 6192 denier poly(hexamethylene adipamide) monofilament with a width-to-thickness and modification ratio of 4.4.

High quality poly(hexamethylene adipamide) polymer is made in a continuous polymerizer having a relative viscosity of 70 and is extruded into a filament at the rate of 43 pounds per hour (19.5 kg/hr) through a rectangular spinneret orifice having rounded corners (2.44×12.7 mm), is passed vertically downward through an air gap of 25½ inches (64.8 cm), and is quenched in water at 22° C. for a distance of about 113 inches (287 cm). After water quenching, the amount of residual quench water on the filament is regulated by adjustment of the air flow in an air jet so that quantity of water on the surface of the filament is between 10 and 25% by weight water on the dry weight of the monofilament. The wet monofilament is then forwarded in sequence to a puller roll at 91.7 ypm (83.8 mpm), pretension rolls at 91.8 ypm (83.9 mpm), and feed rolls at 93.1 ypm (85.1 mpm). After the feed rolls, water is added to the monofilament by contacting the filament with felt wicks supplied at the rate of 0.8 gallon per hour (13% water based on dry weight of the filament) and the filament is forwarded into a 36 cm long steamer and treated with saturated steam at 145 psig (180° C.). The steamer has entrance and exit steam expansion chambers connected to a vacuum source to prevent steam from leaking into the plant environment. The draw point is maintained in the entrance steam expansion chamber.

While still in the steamer but near the exit end, the monofilament is run through a bath about 3 cm long containing water at a temperature of about 60° C. and flowing at the rate of about four gallons per hour. The surface of the monofilament is cooled in the bath before leaving the steamer. The monofilament is then forwarded to an air stripper which removes most of the surface water from the filament to a level <2% water on weight of the dry filament. The monofilament is then forwarded to the first stage draw rolls which are heated to 155° C. and running at 348 ypm (318 mpm).

The filament is then forwarded in three passes through a radiant heater of about 50 inches (127 cm) in length at a mean temperature of about 870° C. Three controlled-speed change-of-direction rolls are employed to advance the monofilament through the heater and to control the amount of draw in each pass. The roll speed before pass 1 is 361 ypm (330 mpm), before pass 2 is 443 ypm (405 mpm), before pass 3 is 474 ypm (434 mpm), and after pass 3 is 523 ypm (478 mpm). The monofilament is then forwarded to second-stage draw rolls running at about 534 ypm (488 mpm), let down rolls at about 524 ypm (479 mpm) and to a wind-up package. The tension at wind-up is about 900 grams and is adjusted to give good package formation.

The product of the process is an obround 4.4 width-to-thickness and modification ratio monofilament of 6192 denier with 24 hour conditioned properties of:

| | |
|---|---|
| Tenacity (gpd) | 9.1 |
| Knot strength (gpd) | 5.5 |
| Modulus (gpd) | 51.0 |
| Width (inches) | .066 |
| Thickness (inches) | .015 |
| Toughness (g-cm/denier-cm) | .82 |

Monofilament tire cords were prepared from monofilament of this Example by the method described in Example 3 hereinafter and demonstrated the following fully conditioned properties:

| | |
|---|---|
| Denier (fully cond.) | 6310 |
| Dip Pick-Up, % | 5.1 |
| Brk. Str., kg | 53 |
| 177° C. Shrinkage, % | 4.3 |
| Toughness (gm-cm/denier-cm) | .77 |
| Modulus (gpd) | 46 |

EXAMPLE 3

The control and example 3 radial tires were assembled in two stages on a radial tire manufacturing machine made by NRM, Inc., Model RF 1216. The assembled tires were molded and cured in a Bag-O-Matic curing press manufactured by Akron Standard Co.

The D-417B dip bath used for the Control polyester tire cords was composed of: water (83.7 parts by weight); Gum Tragacanth, 2% solution (2.0 parts by weight); N.E.R.-010A Epoxy resin (1.4 parts by weight); and LVBI Isocyanate slurry, 25% dispersion (12.9 parts by weight).

D-5A is a resorcinol-formaldehyde latex-based adhesive and is applied on top of isocyanate-based subcoat adhesive to promote adhesion of cord to rubber when preparing polyester tire cords. When preparing nylon monofilament tire cords, D-5A is used without the isocyanate subcoat.

Radial Control Tire

Radial passenger tires were built utilizing one ply of polyester fabric for carcass reinforcement, two plies of 1×4×0.25 steel cord for belts, and one ply of nylon fabric for a cap ply. The yarn utilized for the carcass cord was conventional 1,000 denier, 192 filament T-900 tire yarn from Hoechst-Celanese Co. This yarn was twisted into a 1,000/1/2 cord construction with 11 turns per inch twist imparted in both plying and cabling steps. This cord was then hot stretched in a two oven process using a conventional 2-step polyester adhesive dip. Specific conditions employed were 470/420° F., 50/80 seconds exposure time, 3/0% applied stretch, D417B/D-5A adhesive. The carcass fabric was then formed from a single end of cord using a drum winding process so that the resulting fabric had the cords running in a generally evenly-spaced apart relationship. Two plies of 20 mil skim rubber (80% natural rubber/20% styrene butadiene rubber) were used in preparing the carcass fabric. Belt plies and cap plies were formed from steel cord and 840/1/2 nylon cord respectively, using similar drum winding processes. P155/80R13 tires were then built from this fabric using the NRM Corp. tire building equipment. Other components used in constructing the tire were tread and sidewall sections extruded from styrene-butadiene/natural rubber blends, a 50 mil thick sheet of chlorobutyl/natural rubber innerliner, a 20 mil cushion of carcass stock inserted between the innerliner and carcass, and a pair of rubber wrapped 4-wire/4-turn beads. The ends of the carcass ply were turned up over the tire beads, with the end of the ply extending about 2 inches above the bead. The green tire was cured at about 295° F. in the Bag-O-Matic tire curing press using a commercial P155/80R13 tire mold. Additional details of tire construction and radial tire test results are given in Table 1.

EXAMPLE 3

Tire

P155/80R13 radial passenger tires were built using a construction identical to the Radial Control except that one ply of the 4540 denier poly(hexamethylene adipamide) monofilament of Example 1 (obround cross-section with a width-to-thickness and modification ratio of 4.8, a break strength of 39 kg and a relative viscosity of 70) was used for carcass reinforcement. Process conditions used to dip-stretch the monofil cord were 420° F./60 seconds exposure/1.5% applied stretch. A single step adhesive (20%D-5A) was all that was required for the monofil. (See Table at end of Example 1). The number of ends of monofil in the fabric was adjusted to provide the same carcass strength as in the polyester Radial Control fabric.

Tire testing was conducted on two tires per item and the average results are compared in Table 1. The Example 3 monofilament tires exhibited clearly superior durability in bead area endurance (BAE) testing on the indoor test wheel. The monofilament tires were slightly cooler running as evidenced by contained air temperatures (CAT) monitored by a thermocouple during BAE testing. The bending stiffness of the monofilament fabric made from Example 1 and used to construct the tire carcass was significantly lower than equal carcass strength fabric made from multifilament 1000/1/2 polyester cord that had only about ½ the total denier of the 4450 denier monofilament (Table 2).

TABLE 1

TIRE CONSTRUCTION - 1-PLY CARCASS (P155/80R13)

|  | Radial Control Tires Polyester Multifilament | Example 3 Tire Polyamide Monofilament (Exam 1) |
|---|---|---|
| Carcass | | |
| Construction | 1000/1/2 | 4540d* |
| No. Plies | 1 | 1 |
| Cord Gauge, Mils | .021 | .012 × .058 |
| Epi | 25 | 9 |
| Rivet Area, % | 47 | 47 |
| Cord Strength, lbs | 30 | 85 |
| Carcass Strength, lbs/in | 750 | 765 |
| Plys width, in | 18¼ | 18¼ |
| Drum Set, in | 11¾ | 11¾ |
| Belt | 1 × 4 × 0.25 wire | 1 × 4 × 0.25 wire |
| epi | 25 | 25 |
| cutting angle | 68° | 68° |
| width | 4⅞" | 4⅞" |
| Cap Ply | 840/1/2 nylon | 840/1/2 nylon |
| epi | 24 | 24 |
| cutting angle | 0° | 0° |
| width | 5¼" | 5¼" |
| Treatment | | |
| Cure | "C" | "C" |
| Post Inflation | None | None |
| Tire Performance | | |
| Rolling resistance, lbs. | 8.1 | 7.7 |
| Cornering coefficient | .17 | .16 |
| Bead area | | |
| endurance test | | |
| CAT @150% load, °F. | 164 | 163 |
| load at failure, % | 210 | 210 |
| miles at failure | 1880 | 2710 |

*Fully Conditioned

TABLE 2

Stiffness of Rubberized Tire Cord Fabrics*

|  | Example 1 | Multifilament Nylon | Multifilament Polyester |
|---|---|---|---|
| Construction | 4450d** | 840/1/2 | 1000/1/2 |
| Cord gauge, in | .012 × .058 | .021 | .021 |
| Epi | 9 | 25 | 25 |
| Carcass str, lbs/in | 765 | 825 | 750 |
| Rivet area, % | 47 | 47 | 47 |
| Fabric bending stiffness, in² lbs/in | .053 | .040 | .116 |

*.020 in layer of rubber on each side of fabric
**Fully Conditioned

I claim:

1. A monofilament of orientated thermoplastic polymer selected from the class consisting of polyamide homopolymers and copolymers and polyester homopolymers and copolymers having an oblong cross-section with a width-to-thickness ration greater than about 2.0 and a modification ration not less than 4.4, said width-to-thickness ratio being less than about 20, said monifilament having a denier of greater than about 1000, a tenacity of greater than about 7.5 g/d and a modulus greater than about 45 g/d.

2. The monofilament of claim 1 wherein said thermoplastic polymer is a polyamide comprising at least about 90% of at least one of the group consisting of poly($\epsilon$-caproamide) and poly(hexamethylene adipamide).

3. The monofilament of claim 1 wherein said thermoplastic polymer is poly(hexamethylene adipamide).

4. The monofilament of claim 1 wherein said thermoplastic polymer is poly(ethylene terephthalate).

5. The monofilament of claim 2 wherein said monofilament has a tenacity of above about 8.0 g/d and a modulus of greater than about 50 g/d.

6. The monofilament of claim 2 wherein said monofilament has a surface layer at least 3 and less than about 15 microns thick, said layer having an orientation lower than the core and a parallel refractive index for the polymer in said surface layer of less than 1.57.

7. The monofilament of claim 2 wherein said polyamide has a relative viscosity of greater than about 50.

8. The monofilament of claim 2 wherein said monofilament has a toughness of greater than about 0.7 g-cm/denier-cm.

9. The monofilament of claim 2 having a knot strength of greater than about 5.0 g/d.

10. The monofilament of claim 1 wherein said cross-section of said monofilament is obround.

11. The monofilament of claim 1 having a denier of greater than about 2000.

* * * * *